US010283998B2

United States Patent
Hong

(10) Patent No.: US 10,283,998 B2
(45) Date of Patent: May 7, 2019

(54) WIRELESS CHARGING PAD, WIRELESS CHARGING DEVICE, AND ELECTRONIC DEVICE USING THE SAME

(71) Applicant: Samsung Electronics Co., Ltd., Gyeonggi-do (KR)

(72) Inventor: Eun Seok Hong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 87 days.

(21) Appl. No.: 15/156,474

(22) Filed: May 17, 2016

(65) Prior Publication Data

US 2016/0344224 A1 Nov. 24, 2016

(30) Foreign Application Priority Data

May 19, 2015 (KR) .................. 10-2015-0069455

(51) Int. Cl.
| | |
|---|---|
| H02J 7/00 | (2006.01) |
| H02J 7/02 | (2016.01) |
| H02J 50/10 | (2016.01) |
| H02J 50/90 | (2016.01) |
| H01F 38/14 | (2006.01) |

(52) U.S. Cl.
CPC .............. H02J 7/025 (2013.01); H02J 7/027 (2013.01); H02J 50/10 (2016.02); H02J 50/90 (2016.02); H01F 38/14 (2013.01)

(58) Field of Classification Search
CPC ........................................ H02J 7/025
USPC ........................................ 320/108
See application file for complete search history.

(56) References Cited

U.S. PATENT DOCUMENTS

| | | | |
|---|---|---|---|
| 8,169,185 B2* | 5/2012 | Partovi | ............ H01F 5/003 320/108 |
| 8,766,484 B2 | 7/2014 | Baarman et al. | |
| 8,829,731 B2 | 9/2014 | Baarman et al. | |
| 9,242,804 B2 | 1/2016 | Trebbi et al. | |
| 2009/0212637 A1 | 8/2009 | Baarman et al. | |

(Continued)

FOREIGN PATENT DOCUMENTS

| | | |
|---|---|---|
| KR | 10-1250290 B1 | 4/2013 |
| WO | 2010/129369 A2 | 11/2010 |

(Continued)

OTHER PUBLICATIONS

European Search Report dated Oct. 19, 2016.
European Search Report dated Jun. 8, 2018.

*Primary Examiner* — Nathaniel R Pelton
*Assistant Examiner* — Tessema Kebede
(74) *Attorney, Agent, or Firm* — Cha & Reiter, LLC.

(57) ABSTRACT

A wireless charging pad, a wireless charging device including the wireless charging pad, and an electronic device using the wireless charging device are provided. The wireless charging pad includes a pad case, a transmit (TX) coil disposed on an inner side of the pad case, and wound to form a surface for which a central portion of the TX coil is empty, a TX coil substrate on which the TX coil is disposed, a pad magnetic substance disposed on the TX coil substrate at a distance from the central portion of the TX coil, and a supporting structure supporting the TX coil substrate, the supporting structure movable relative to the pad case.

7 Claims, 13 Drawing Sheets

(56) References Cited

U.S. PATENT DOCUMENTS

| | | | |
|---|---|---|---|
| 2011/0050164 A1* | 3/2011 | Partovi | H01F 5/003 320/108 |
| 2011/0074344 A1* | 3/2011 | Park | H01F 38/14 320/108 |
| 2012/0062171 A1 | 3/2012 | Smith et al. | |
| 2012/0119699 A1* | 5/2012 | Carbunaru | H02J 7/0042 320/108 |
| 2012/0181876 A1 | 7/2012 | Baarman et al. | |
| 2013/0043834 A1* | 2/2013 | Smith | A61L 2/00 320/108 |
| 2013/0162202 A1* | 6/2013 | Wang | G06F 3/044 320/108 |
| 2014/0167524 A1 | 6/2014 | Oodachi et al. | |
| 2015/0047951 A1 | 2/2015 | Trebbi et al. | |
| 2015/0076929 A1* | 3/2015 | Elenga | H02K 41/0356 310/12.15 |
| 2015/0102771 A1 | 4/2015 | Fukuda | |
| 2015/0246777 A1 | 9/2015 | Trebbi et al. | |
| 2016/0141884 A1 | 5/2016 | Lee et al. | |
| 2016/0226313 A1 | 8/2016 | Okubo | |

FOREIGN PATENT DOCUMENTS

| | | |
|---|---|---|
| WO | 2013/038783 A2 | 3/2013 |
| WO | 2015/002422 A1 | 1/2015 |
| WO | 2015/037046 A1 | 3/2015 |

* cited by examiner

US 10,283,998 B2

WIRELESS CHARGING PAD, WIRELESS CHARGING DEVICE, AND ELECTRONIC DEVICE USING THE SAME

CLAIM OF PRIORITY

This application claims the benefit under 35 U.S.C. § 119(a) of a Korean patent application filed on May 19, 2015 in the Korean Intellectual Property Office and assigned Serial number 10-2015-0069455, the entire disclosure of which is hereby incorporated by reference.

TECHNICAL FIELD

The present disclosure relates to wireless charging.

BACKGROUND

An electronic device may receive power, associated with driving the electronic device, from its battery. The electronic device may charge the battery using a wireless charging method. Associated with the wireless charging method, the electronic device may include a received (RX) coil which may receive power. Also, there may be a wireless charging device including a transmit (TX) coil for supplying power to the electronic device.

In the wireless charging method, if the RX coil of the electronic device and the TX coil of the wireless charging device are in an error alignment state, a wireless charging efficiency may be abruptly decreased. Also, power supplied from the TX coil of the wireless charging device may be excessively increased in the error alignment, thus being highly heated in the electronic device.

SUMMARY

An aspect of the present disclosure is to provide a wireless charging pad for more accurately aligning a wireless charging device and an electronic device, the wireless charging device, and the electronic device for supporting the same.

In accordance with an aspect of the present disclosure, an electronic device is provided. The electronic device includes a receive (RC) coil wound as to form a surface such that a central portion of the RX coil is empty, a device magnetic substance disposed at a distance from the central portion of the RC coil, and a wireless charging module configured to receive power induced to the RX coil.

In accordance with another aspect of the present disclosure, a wireless charging pad is provided. The wireless charging pad includes a pad case, a transmit (TX) coil disposed on an inner side of the pad case, and wound to form a surface for which a central portion of the TX coil is empty, a TX coil substrate on which the TX coil is disposed, a pad magnetic substance disposed on the TX coil substrate at a distance from the central portion of the TX coil, and a supporting structure supporting the TX coil substrate, the supporting structure movable relative to the pad case.

In accordance with another aspect of the present disclosure, a wireless charging device is provided. The wireless charging pad includes a pad case, a TX coil disposed on an inner side of the pad case and wound to form a surface for which a central portion is empty, a TX coil substrate on which the TX coil is disposed, a pad magnetic substance disposed on the TX coil substrate at a distance from the central portion of the TX coil, and a supporting structure supporting the TX coil substrate, the supporting structure movable relative to the pad case, and a charging cable and an adapter configured to operatively connected with an external power supply to supply power to the wireless charging pad.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
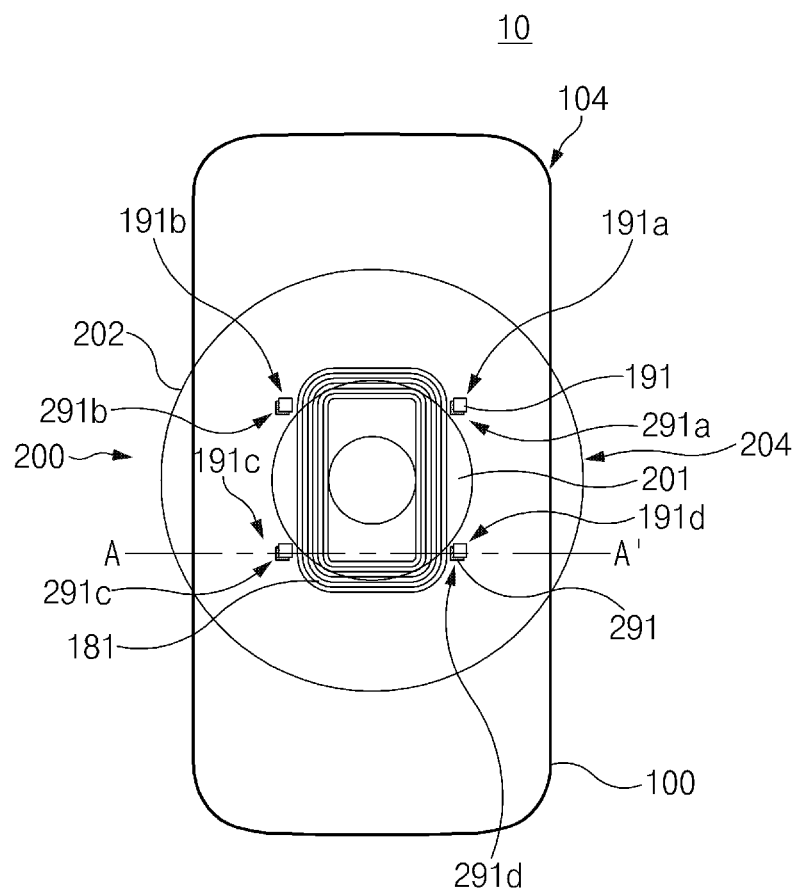
FIG. 1 is a drawing illustrating a wireless charging system according to an embodiment of the present disclosure.

Hereinafter, the present disclosure is described with reference to the accompanying drawings. However, the present disclosure is not intended to be limited to the specific embodiments, and it is understood that it should include all modifications and/or, equivalents and substitutes within the technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a drawing illustrating a wireless charging system according to an embodiment of the present disclosure.

Referring to FIG. 1, a wireless charging system 10 may include a wireless charging device 200 and an electronic device 100.

The wireless charging device 200 may include a wireless charging pad 202. Additionally, although not illustrated, the wireless charging device 200 may further include components such as an adaptor which connects to an outlet and the like for supplying power to the wireless charging pad 202, and a charging cable which connects the wireless charging pad 202 with the adaptor.

The wireless charging pad 202 may include a transmit (TX) coil 201, at least one pad magnetic substance 291 disposed on an outer portion of the TX coil 201, and a pad case 204 which covers the TX coil 201 and the at least one pad magnetic substance 291. Additionally, the wireless charging pad 202 may further include a TX power circuit which operatively couples/connects with the charging cable and supplies power received from the outlet to the TX coil 201.

The pad case 204 of the wireless charging pad 202 may be configured as, for example, a circle or a polygon (e.g., a quadrangle), and the like. A diameter of the pad case 204 may be configured to be longer than a short-axis length of the electronic device 100. However, various embodiments of the present disclosure may not be limited thereto. For example, the diameter of the pad case 204 may be configured to be shorter than the short-axis length of the electronic device 100.

The at least one TX coil 201 may be wound and disposed at an inner side of a central portion of the pad case 204. The TX coil 201 may have a certain thickness forming a certain surface area while wound. The TX coil 201 may be implemented with, for example, a ring shape for which a central portion is empty. The TX coil 201 may be configured to be relatively larger in size than, for example, a receive (RX) coil 181 disposed within the electronic device 100 and implemented as a predetermined size. Alternatively, the TX coil 201 may be substantially the same size, or similar in size or shape to the RX coil 181.

The at least one pad magnetic substance 291 may be disposed on a region adjacent to the TX coil 201. According to various embodiments, the pad magnetic substance 291 may be a magnet having a magnetic force of a predetermined level or more. The pad magnetic substance 291 may be, for example, a ferromagnetic substance, a ferrimagnetic substance, or an antiferromagnetic substance.

The at least one pad magnetic substance 291 may be disposed on a certain point of an outer portion of the TX coil 201. For example, the at least one pad magnetic substance 291 may include a plurality of pad sub magnetic substances. According to an embodiment, the plurality of pad sub magnetic substances may be disposed to be symmetrical with each other with respect to a central point of the TX coil 201. Referring to FIG. 1, the plurality of pad sub magnetic substances may include a first pad sub magnetic substance 291a, a second pad sub magnetic substance 291b, a third pad sub magnetic substance 291c, and a fourth pad sub magnetic substance 291d. The first pad sub magnetic substance 291a may be disposed on, for example, a position which is symmetrical with the third pad sub magnetic substance 291c with respect to a central point (or an origin point) of the TX coil 201. The second pad sub magnetic substance 291b may be disposed on, for example, a position which is symmetrical with the fourth pad sub magnetic substance 291d with respect to a central point (or an origin point) of the TX coil 201.

A first gap between the first pad sub magnetic substance 291a and the second pad sub magnetic substance 291b may be substantially the same or similar to a second gap between the first pad sub magnetic substance 291a and the third pad sub magnetic substance 291c. Also, a third gap between the fourth pad sub magnetic substance 291d and the second pad sub magnetic substance 291b may be substantially the same or similar to a fourth gap between the fourth gap between the fourth pad sub magnetic substance 291d and the third pad sub magnetic substance 291c. In FIG. 1, an embodiment is depicted in which four pad sub magnetic substances 291a to 291d are provided. However, various embodiments may not be limited thereto. For example, the number of pad sub magnetic substances utilized may be fewer or more, such as 2, 3, 5, 6, or 8 pad sub magnetic substances. Any arrangement and number may be utilized as desired.

According to various embodiments, the pad magnetic substance 291 may be implemented in the form of a rod having a certain length. For example, the pad magnetic substance 291 may include a rod-shaped magnetic substance which couples and/or connects to a point on the first sub magnetic substance 291a, with a point on the second pad sub magnetic substance 291b. The pad magnetic substance 291 may include a rod-shaped magnetic substance which connects and/or couples to a point on the third pad sub magnetic substance 291c with a point on the fourth pad sub magnetic substance 291d. Also, the pad magnetic substance 291 may include a rod-shape magnetic substance which connects and/or couples the point on the first pad sub magnetic substance 291a with a point on the third pad sub magnetic substance 291c. The pad magnetic substance 291 may include a rod-shaped magnetic substance which couples and/or connects the point on the second pad sub magnetic substance 291b with the point on the fourth pad sub magnetic substance 291d. Therefore, the pad magnetic substance 291 may be disposed on a position where the rod-shaped magnetic substances are symmetrical with each other with respect to the center of the TX coil 201. Alternatively, the pad magnetic substance 291 may have a band shape of connecting the rod-shaped magnetic substances with each other.

The first to fourth pad sub magnetic substances 291a to 291d may be disposed on the same surface. For example, the first to fourth pad sub magnetic substances 291a to 291d may be disposed on a certain region of a substrate on which the TX coil 201 is disposed, such as an inner side of the pad case 204, or on a surface of the pad case 204, and the like. According to various embodiments, at least some of the first to fourth pad sub magnetic substances 291a to 291d may be located on another surface. For example, some of the first to fourth pad sub magnetic substances 291a to 291d may be disposed inside the pad case 204, and the others may be disposed outside the pad case 204.

A display is disposed in the electronic device 100. The electronic device 100 may include a device case 104 which at least partially covers the display. The electronic device 100 may include the RX coil 181 and at least one device magnetic substance 191 at an inner side of the device case 140. Additionally, the electronic device 100 may further include a wireless charging module which connects with the RX coil 181 and charges its battery.

According to an embodiment, the electronic device 100 may be implemented in the form of, for example, a rectangle, one end of which is longer in length than the other end. However, the form of the electronic device may not be limited thereto. For example, the electronic device 100 may be implemented with a length for which each edge has a same length as the others. Also, in some embodiments, at least part of the electronic device 100 may include a curved region. For example, the electronic device 100 may include a shape (e.g., a curved region), at least one of both sides of which is bent in an inner or outer direction.

The RX coil 181 may collect current induced by power which flows in the TX coil 201 and supply the collected current to the wireless charging module. The RX coil 181 may be disposed in, for example, a central portion of the electronic device 100. A conductive line having a certain thickness may be wound to form the RX coil 181. According to an embodiment, the RX coil 181 may include a hollow of a certain size, formed in the center of the RX coil 181, and having a surface of a certain width caused by the RX coil 181 being wound a number of times. As shown in FIG. 1, the RX coil 181 may have a rectangle band shape (e.g., or an oval band shape or a polygonal band shape), the center of which is empty, which in this example matches a mechanical form (e.g., physical profile) of the electronic device 100, efficiently utilizing whatever limited space is provided at the position where the RX coil 181 is disposed. Herein, various embodiments may not be limited thereto. For example, the RX coil 181 may have a form corresponding to that of the TX coil 201. Alternatively, the RX coil 181 may be substantially the same or similar in shape to the TX coil 201. The RX coil 181 may be disposed at, for example, an inner side of a rear surface of the device case 104 of the electronic device 100.

Figure 2:
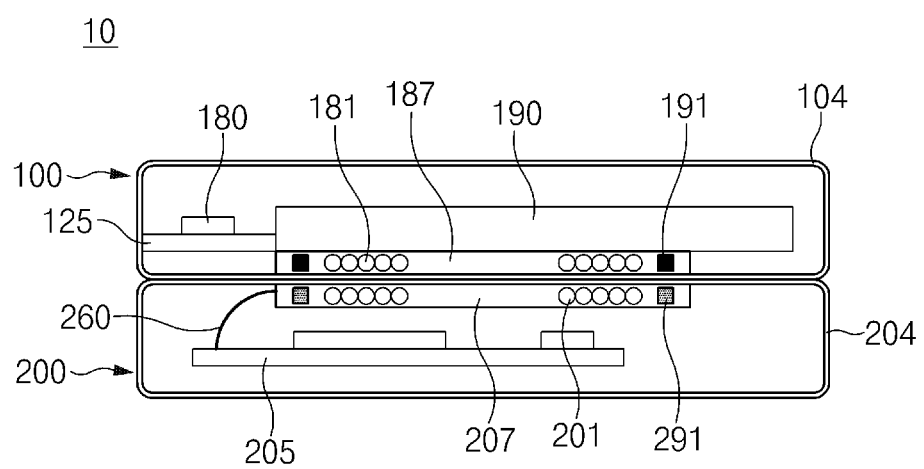
FIG. 2 is a drawing illustrating some of components of a wireless charging system including an electronic device in which a device magnetic substance associated with wireless charging is disposed on one side of a receive (RX) coil substrate, according to an embodiment.

The at least one device magnetic substance 191 may be disposed on a region adjacent to the RX coil 181. The at least one device magnetic substance 191 may be disposed on, for example, a certain region of an outer portion of the RX coil 181. In FIG. 2, an embodiment is exemplified as the device magnetic substance 191 includes four device sub magnetic substances 191a to 191d. The four device sub magnetic substances 191a to 191d may include, for example, the first device sub magnetic substance 191a, the second device sub magnetic substance 191b, the third device sub magnetic substance 191c, and the fourth device sub magnetic substance 191d. A gap between the first device sub magnetic substance 191a and the second device sub magnetic substance 191*b* may be substantially the same as (or similar to) a gap between the first pad sub magnetic substance 291*a* and the second pad sub magnetic substance 291*b*. Also, a gap between the third device sub magnetic substance 191*c* and the fourth device sub magnetic substance 191*d* may be substantially the same as (or similar to) a gap between the third pad sub magnetic substance 291*c* and the fourth pad sub magnetic substance 291*d*. Also, a gap between the first device sub magnetic substance 191*a* and the third device sub magnetic substance 191*c* may be the same as (or similar to) a gap between the first pad sub magnetic substance 291*a* and the third pad sub magnetic substance 291*c*. As described above, positions of the first to fourth device sub magnetic substances 191*a* to 191*d* may correspond to positions of the first to fourth pad sub magnetic substances 291*a* to 291*d*, respectively.

According to various embodiments, the device magnetic substance 191 may be implemented with the same or similar shape to the pad magnetic substance 291. For example, as described above, if rod-shaped magnetic substances of the pad magnetic substance 291 are implemented to be symmetrical with each other at a predetermined interval with respect to an origin point, rod-shaped magnetic substances of the device magnetic substance 191 may be implemented to be symmetrical with each other at a predetermined interval. The device magnetic substance 191 may be made of, for example, materials which may exert gravitation in response to a magnetic force. For example, the device magnetic substance 191 may be an iron plate or a metal plate such as copper and aluminum. Alternatively, the device magnetic substance 191 may be implemented with a ferromagnetic substance. In this case, the device magnetic substance 191 may have polarity, opposite to polarity of the pad magnetic substance 291, disposed in the direction of the pad magnetic substance 291 to generate gravitation with the pad magnetic substance 291.

FIG. 2 is a drawing illustrating some of components of a wireless charging system including an electronic device in which a device magnetic substance associated with wireless charging is disposed on one side of a receive (RX) coil substrate, according to an embodiment. FIG. 2 is a cross-section view taken along the line A-A' of FIG. 1. FIG. 2 illustrates some of components of an electronic device 100 and a wireless charging device 200 for convenience of description according to various embodiments.

Referring to FIG. 2, the electronic device 100 may include a device case 104, an RX coil substrate 187 disposed at an inner side of the device case 104, an RX coil 181 disposed on the RX coil substrate 187 (or an inner side of the RX coil substrate 187), a device magnetic substance 191 disposed on the RX coil substrate 187 (or an inner side of the RX coil substrate), a battery 190 disposed on the RX coil substrate 187, a device printed circuit board (PCB) 125 disposed at one side of the battery 190, and a wireless charging module 180.

For example, the device case 104 may be implemented in the form of covering at least a portion of an outer portion of a display of the electronic device 100, such that the display is exposed to its one side. The device case 104 may have a removable battery cover or may be implemented with an "integral type" based on an insertion type battery 190 (e.g., an embedded type or a removable type of battery). A surface of the device case 104 that faces the wireless charging device 200 may correspond to a rear surface of the device case 104. The RX coil substrate 187 and the RX coil 181 may be disposed at an inner side of the rear surface of the device case 104, and the battery 190 may be disposed on the RX coil substrate 187 and the RX coil 181. In FIG. 2, an embodiment is exemplified in which the device case 104 has one container shape. Various embodiments may not be limited thereto. For example, the device case 104 may be divided into a front case which supports the display, a rear surface which supports the front case and further includes a region where the battery 190 is held, and a battery case which covers the rear case. Alternatively, the device case 104 may be implemented having an integrated form including at least one of the front case, the rear case, or the battery case.

The RX coil substrate 187 may be a substrate on which the RX coil 181 is disposed. For example, this RX coil substrate 187 may be implemented in the form of having a certain strong property for supporting the RX coil 181 and may be made of various nonconductive materials such as a plastic substrate or a wood substrate. According to an embodiment, the RX coil substrate 187 may be made of a polymer material or a fiber material, and the like. For example, the RX coil 181 disposed on the RX coil substrate 187 may be patterned for implementation of the RX coil substrate 187. According to an embodiment, the RX coil substrate 187 may be implemented as a thin film substrate (e.g., a film form for the relevant substrate). Alternatively, the RX coil substrate 187 may include an engraved region on which the RX coil 181 is to be disposed. The device magnetic substance 191 may be disposed on one side of the RX coil substrate 187. For example, the RX coil 181 may be disposed on a central portion of the RX coil substrate 187, and the device magnetic substance 191 may be disposed on the RX coil substrate 187 that is situated in a certain position of an outer portion of the RX coil 181.

The RX coil 181 may be disposed on the RX coil substrate 187 (or an engraved region of the RX coil substrate 187). The RX coil 181 may be wound some predetermined number of times. Therefore, as shown in FIG. 2, the RX coil 181 may form a certain surface. Since there is no coil in a central portion of the RX coil 181, an empty region may be disposed in the central portion of the RX coil 181.

The device magnetic substance 191 may be disposed on the RX coil substrate 187 (or the engraved region of the RX coil substrate 187). The device magnetic substance 191 may be arranged in parallel with the RX coil 181 and may be disposed on an edge of the RX coil substrate 187. An edge region of the RX coil substrate 187 may correspond to an outer portion of the RX coil 181.

The RX coil substrate 187 on which the RX coil 181 and the device magnetic substance 191 are disposed on may be situated at, for example, an inner side of a rear surface of the device case 104. Alternatively, the RX coil substrate 187 may be arranged on a surface of the battery 190, and may be oriented in the direction of the device case 104.

The battery 190 may be disposed to face the RX coil substrate 187. According to an embodiment, the RX coil substrate 187 may be disposed on a surface of the battery 190. One side of the battery 190 may connect with the device PCB 125. The battery 190 may be charged using power induced to the RX coil 181.

The device PCB 125 may include a signal line connected with one side of the battery 190. Also, the device PCB 125 may include a signal line to which the RX coil 181 connects.

The wireless charging module 180 may be disposed on the device PCB 125 to collect (e.g., receive, obtain) power induced to the RX coil 181. The wireless charging module 180 may convert the collected power in the form of voltage for charging the battery 190, and may supply the voltage to the battery 190.

The wireless charging device 200 may include a pad case 204, a pad PCB 205, a power cable 260, a TX coil substrate 207, a TX coil 201, and a pad magnetic substance 291.

For example, the pad case 204 may be implemented to cover the pad PCB 205, the TX coil substrate 207, the TX coil 201, the pad magnetic substance 291, and the like. The pad case 204 may be made of, for example, a transparent material and the like. According to an embodiment, at least part of the pad case 204 may be made of a transparent plastic, acrylic, or glass, and the like. For example, a predetermined region, including a region where the TX coil 201 is disposed, in the pad case 204 may be formed of a transparent material. In FIG. 2, an embodiment is exemplified as the pad case 204 is similar in size to the electronic device 100. However, various embodiments may not be limited thereto. For example, the pad case 204 may be implemented to have a longer diameter than a length of one side of the electronic device 100. Alternatively, the pad case 204 may be implemented to have a shorter diameter than the length of the one side of the electronic device 100.

The pad PCB 205 may include a signal line operatively connecting/coupling to the power cable 260 and a line for supplying power to the TX coil 201. Also, the pad PCB 205 may include a TX power circuit which processes power supplied from the power cable 260 to be output at a predetermined frequency, through the TX coil 201. This pad PCB 205 may be fixed to, for example, one side of the pad case 204.

The power cable 260 may be a cable which connects the pad PCB 205 with the TX coil 201. This power cable 260 may be in the form of, for example, a flexible PCB (FPCB). Alternatively, the power cable 260 may be a coaxial cable having flexibility of a predetermined level. Therefore, the power cable 260 may be implemented to allow movement in response to motion of the TX coil substrate 207.

The TX coil 201 may be disposed on, for example, the TX coil substrate 207 (or an engraved certain region of the TX coil substrate 207). The TX coil substrate 207 may have a larger region than the entire size (e.g., an entirety) of the TX coil 201. The TX coil substrate 207 may be made of a nonconductive material. For example, one side of the TX coil substrate 207 may elastically connect to the device case 104. Therefore, if an external pressure is provided or if a magnetic force having flux of a certain direction is formed, the TX coil substrate 207 may move in the corresponding direction. If the external pressure or the magnetic force is released, the TX coil substrate 207 may return to an original position (e.g., a central portion of the device case 104).

The TX coil 201 may be disposed on the TX coil substrate 207 (or an engraved region of the TX coil substrate 207). As described above, a line of a conductive material is wound into a ring shape to form the TX coil 201. Therefore, as shown in FIG. 2B, the TX coil 201 may form a certain surface (e.g., an area), a central portion of which is empty. One side of the TX coil 201 may operatively couple/connect to the TX power circuit disposed on the pad PCB 205.

The pad magnetic substance 291 may be disposed on a certain position of the TX coil substrate 207 (e.g., an edge of the TX coil substrate 207 or an engraved region of the edge of the TX coil substrate 207). For example, the pad magnetic substance 291 may be implemented such that it may be pulled by a magnetic force (or gravitation) along with the device magnetic substance 191. In this regard, the pad magnetic substance 291 may be a permanent magnet having a magnetic force of a certain level. This pad magnetic substance 291 may be substantially the same in form as the device magnetic substance 191.

As described above, the RX coil 181 of the electronic device 100 according to an embodiment may be disposed between the battery 190 and a rear surface of the device case 104. The device magnetic substance 191 may be disposed on a surface which is in parallel with the RX coil 181.

Figure 3:
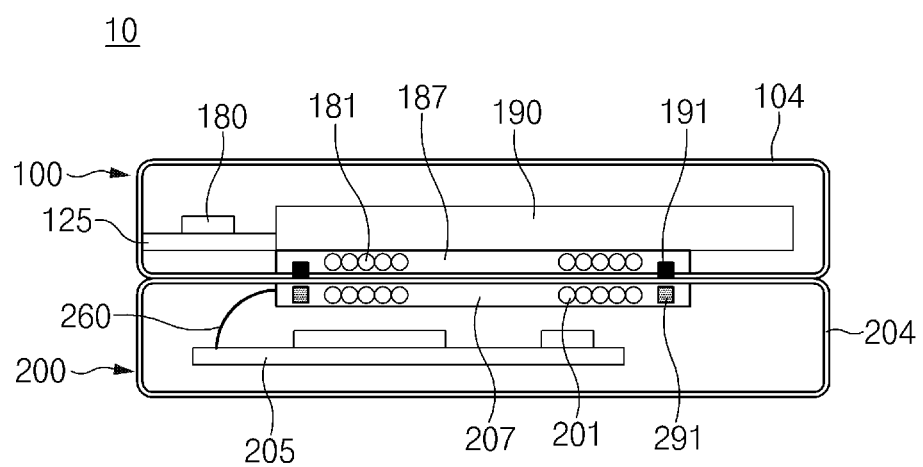
FIG. 3 is a drawing illustrating some of components of a wireless charging system including an electronic device in which a device magnetic substance associated with wireless charging is disposed at one side of a device case, according to an embodiment.

FIG. 3 is a drawing illustrating some of components of a wireless charging system including an electronic device in which a device magnetic substance associated with wireless charging is disposed at one side of a device case, according to an embodiment of the present disclosure.

Referring to FIG. 3, an electronic device 100 may include a device case 104, an RX coil substrate 187 disposed at an inner side of the device case 104, an RX coil 181 disposed on the RX coil substrate 187 (or an inner side of the RX coil substrate 187), a device magnetic substance 191 disposed at one side of the device case 104, a battery 190 disposed on the RX coil substrate 187, a device PCB 125 disposed at one side of the battery 190, and a wireless charging module 180.

A wireless charging device 200 may include a pad case 204, a pad PCB 205 disposed on a bottom portion of an inner side of the pad case 204, a power cable 260 which operatively connects the pad PCB 205 with a TX coil substrate 207, the TX coil substrate 207 disposed above the pad PCB 205 and operatively connected with a signal line of the pad PCB 205 through the power cable 260, a TX coil 201 disposed on the TX coil substrate 207 (or an engraved region formed in the TX coil substrate 207), and a pad magnetic substance 291 disposed on the TX coil substrate 207 (or an engraved region formed in the TX coil substrate 207).

In the wireless charging system 10 having the above-mentioned components, the device magnetic substance 191 may be disposed on a region different from a surface where the RX coil 181 is disposed. For example, as described above, the device magnetic substance 191 may be disposed at one side of the device case 104. According to an embodiment, the device magnetic substance 191 may be disposed on an inner side of a rear surface of the device case 104. Alternatively, as shown in FIG. 3, the device magnetic substance 191 may be disposed penetrating a rear surface of the device case 104. In this regard, the device case 104 may include at least one hole through or in which the device magnetic substance 191 may be disposed. The device magnetic substance 191 may be inserted and fixed into the hole. According to various embodiments, the device magnetic substance 191 may be disposed on a rear surface of the device case 104. In this case, the device magnetic substance 191 may be affixed to the rear surface of the device case 104 using an adhesive member and the like. The at least one device magnetic substance 191, disposed at one side of the device case 104, may have a gap corresponding to an arrangement gap of the at least one pad magnetic substance 291.

Figure 4:
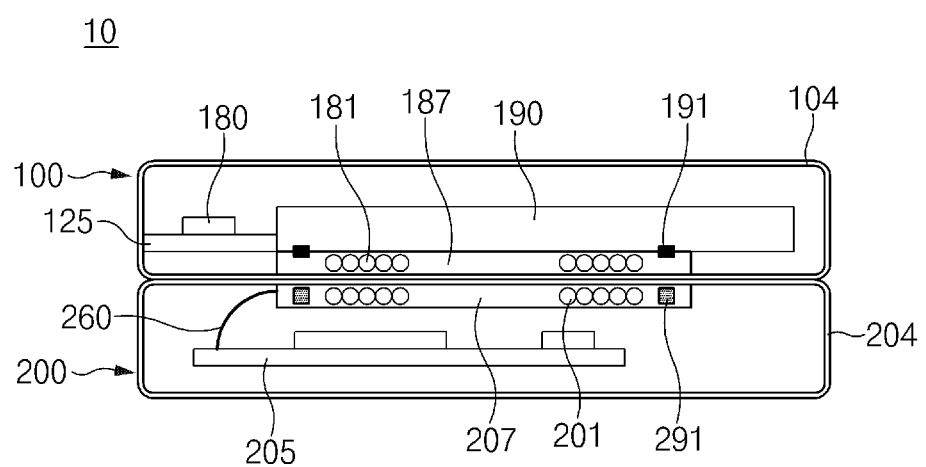
FIG. 4 is a drawing illustrating some of components of a wireless charging system including an electronic device in which a device magnetic substance associated with wireless charging is disposed on one side of a battery, according to an embodiment.

FIG. 4 is a drawing illustrating some of components of a wireless charging system including an electronic device in which a device magnetic substance associated with wireless charging is disposed on one side of a battery, according to an embodiment of the present disclosure.

Referring to FIG. 4, an electronic device 100 may include a device case 104, an RX coil substrate 187 disposed at an inner side of the device case 104, an RX coil 181 disposed on the RX coil substrate 187 (or an inner side of the RX coil substrate 187), a device magnetic substance 191 disposed between a battery 190 and the RX coil substrate 187, the battery 190 disposed on the RX coil substrate 187, a device PCB 125 disposed at one side of the battery 190, and a wireless charging module 180.

A wireless charging device 200 may include a pad case 204, a pad PCB 205 disposed on a bottom portion of an inner side of the pad case 204, a power cable 260 which connects the pad PCB 205 with a TX coil substrate 207, the TX coil substrate 207 which is disposed above the pad PCB 205 and connects with a signal line of the pad PCB 205 through the power cable 260, a TX coil 201 disposed on the TX coil substrate 207 (or an engraved region formed in the TX coil substrate 207), and a pad magnetic substance 291 disposed on the TX coil substrate 207 (or an engraved region formed in the TX coil substrate 207). The at least one pad magnetic substance 291 may be disposed on an edge of the TX coil substrate 207 or an outer portion of the TX coil 201.

In FIG. 4, an embodiment is exemplified as the device magnetic substance 191 is disposed between the battery 190 and the RX coil substrate 187 in the above-mentioned wireless charging system 10. According to an embodiment, the device magnetic substance 191 may be disposed on one side of a surface of the battery 190. In this regard, the device magnetic substance 191 may include a body which plays a role as a magnetic substance and an adhesive member for being affixed to one side of the battery 190. At least one groove may be formed in, for example, a surface of the battery 190 to fix the device magnetic substance 191.

According to various embodiments, the device magnetic substance 191 may be disposed on an upper surface of the RX coil substrate 187 (e.g., a surface of the RX coil substrate 187, faced with the battery 190). Alternatively, a groove of a form into which the device magnetic substance 191 may be inserted may be formed in each of the RX coil substrate 187 and the battery 190. Therefore, the device magnetic substance 191 may be disposed between an upper surface of the RX coil substrate 187 and a lower surface of the battery 190. A position where the device magnetic substance 191 is disposed may be a position which is aligned with the pad magnetic substance 291, disposed in the wireless charging device 200, in a vertical direction. In this regard, an arrangement gap between the at least one device magnetic substance 191 may be substantially the same or similar to an arrangement gap between the at least one pad magnetic substance 291. Also, the device magnetic substance 191 may be substantially the same or similar in size or shape to the pad magnetic substance 291.

Figure 5:
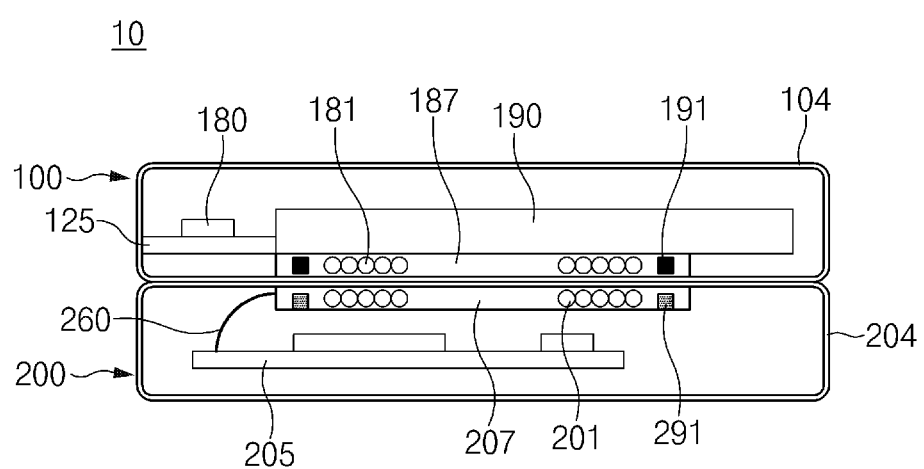
FIG. 5 is a drawing illustrating some of components of a wireless charging system including a wireless charging device in which a pad magnetic substance associated with wireless charging is disposed at one side of a pad case, according to an embodiment.

FIG. 5 is a drawing illustrating some components of a wireless charging system including a wireless charging device in which a pad magnetic substance associated with wireless charging is disposed at one side of a pad case, according to an embodiment.

Referring to FIG. 5, an electronic device 100 may include a device case 104, an RX coil substrate 187 disposed at an inner side of the device case 104, an RX coil 181 disposed on the RX coil substrate 187 (or an inner side of the RX coil substrate 187), a device magnetic substance 191 disposed on one side of the RX coil substrate 187 (e.g., an inner side of the RX coil substrate 187 or an engraved certain region of the RX coil substrate 187), a battery 190 disposed on the RX coil substrate 187, a device PCB 125 disposed at one side of the battery 190, and a wireless charging module 180.

A wireless charging device 200 may include a pad case 204, a pad PCB 205 disposed on a bottom portion of an inner side of the pad case 204, a power cable 260 which operatively connects the pad PCB 205 with a TX coil substrate 207, the TX coil substrate 207 which disposed above the pad PCB 205 and operatively connected with a signal line of the pad PCB 205 through the power cable 260, a TX coil 201 disposed on the TX coil substrate 207 (or an engraved region formed in the TX coil substrate 207), and a pad magnetic substance 291 disposed on a lower portion of the TX coil substrate 207 (or at least part of which is exposed to the lower portion of the TX coil substrate 207).

In FIG. 5, an embodiment is exemplified in which the pad magnetic substance 291 is disposed on one side of a lower portion of the TX coil substrate 207 in the above-mentioned wireless charging system 10. According to an embodiment, the pad magnetic substance 291 may be disposed on a lower surface of the TX coil substrate 207. In this regard, at least one groove in which the pad magnetic substance 291 may be disposed is formed in the lower surface of the TX coil substrate 207 (e.g., a face of the TX coil substrate 207, opposite to a surface faced with the electronic device 100). The pad magnetic substance 291 may be disposed on the lower surface of the TX coil substrate 207 and arranged to protrude from a surface of the TX coil substrate 207.

Figure 6:
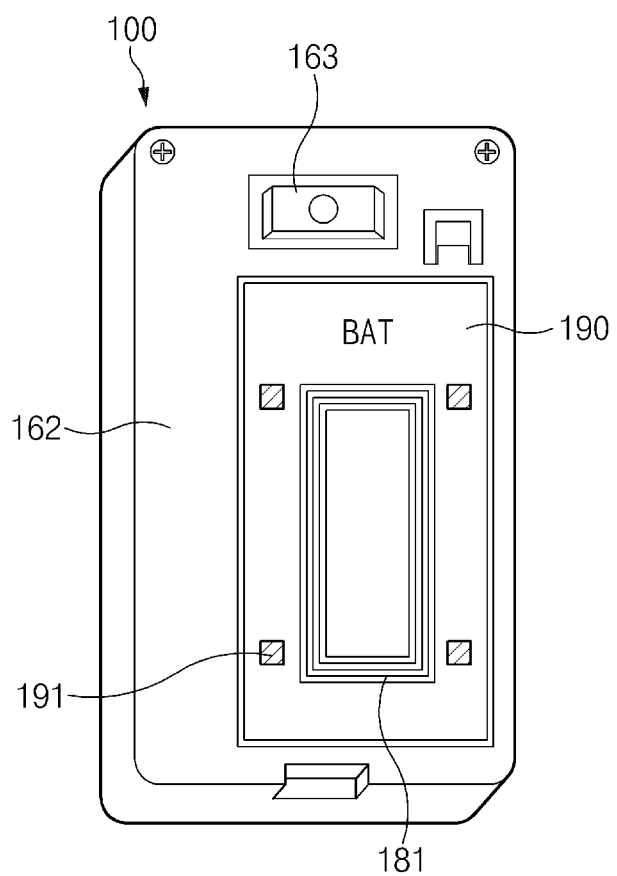
FIG. 6 is a drawing illustrating an electronic device in which a device magnetic substance is disposed on a battery, according to an embodiment.

FIG. 6 is a drawing illustrating an electronic device in which a device magnetic substance is disposed on a battery, according to an embodiment.

Referring to FIG. 6, an embodiment is exemplified illustrating some components of an electronic device 100, including, for example, a rear cover 162 in which a formed region for securing a battery 190 is exposed. An RX coil 181 and a device magnetic substance 191 may be disposed on at least part of the battery 190. For example, the RX coil 181 may be disposed on one side of a surface of the battery 190, a central portion of which is empty. The device magnetic substance 191 may be disposed on the battery 190 and situated on an outer portion of the RX coil 181. An arrangement gap between the at least one device magnetic substance 191 may be substantially the same or similar to that between at least one pad magnetic substance 291 of FIG. 1. According to various embodiments, a battery cover may be provided to cover the rear cover 162. Additionally, the electronic device may further include a camera 163 and the like.

Figure 7:
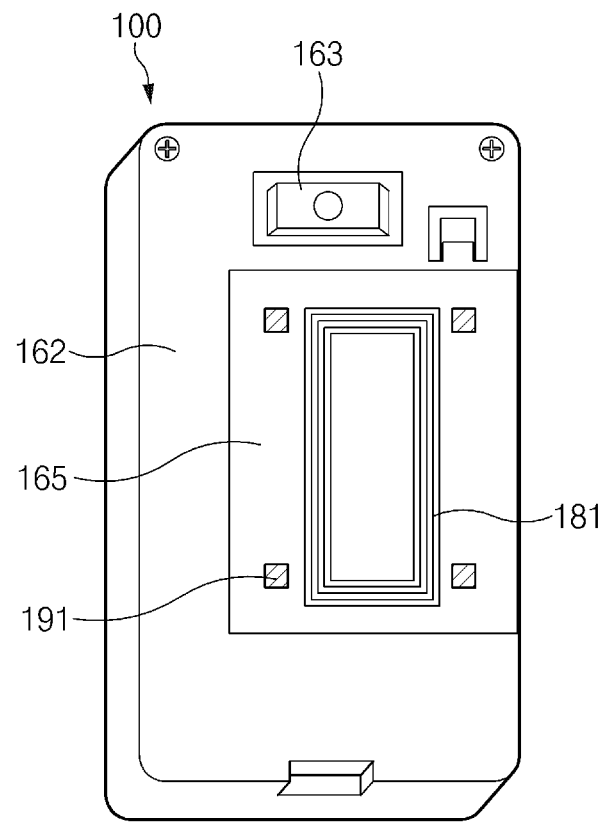
FIG. 7 is a drawing illustrating an electronic device in which a device magnetic substance is disposed on a frame of the electronic device, according to an embodiment.

FIG. 7 is a drawing illustrating an electronic device in which a device magnetic substance is disposed on a frame of the electronic device, according to an embodiment of the present disclosure.

Referring to FIG. 7, an embodiment is exemplified illustrating some components of an electronic device 100, such that, for example, a frame of the electronic device 100 (e.g., a rear cover 162 or a holding cover 165) is exposed. For example, an embodiment is shown in which the rear cover 162 for covering a region including a battery 190 (e.g., of FIG. 6) is exposed. According to various embodiments, the electronic device 100 may be implemented as to include an integrated battery 190. In this regard, the electronic device 100 may include the holding cover 165 for covering a battery holding part, portion or region in which the battery 190 is typically secured. The holding cover 165 may be disposed on a same surface as the rear cover 162. According to an embodiment, an RX coil 181 and a device magnetic substance 191 may be disposed on at least part of the holding cover 165. For example, the RX coil 181 may be disposed at one side of a surface of the holding cover 165. The device magnetic substance 191 may be disposed on the holding cover 165 and situated on an outer portion of the RX coil 181. An arrangement gap between the at least one device magnetic substance 191 may be substantially the same or similar to that between at least one pad magnetic substance 291 of FIG. 2. According to various embodiments, a battery cover may be disposed on the rear cover 161 and the holding cover 165 may cover the rear cover 162. Additionally, the electronic device 100 may further include a camera 163 and the like.

Figure 8:
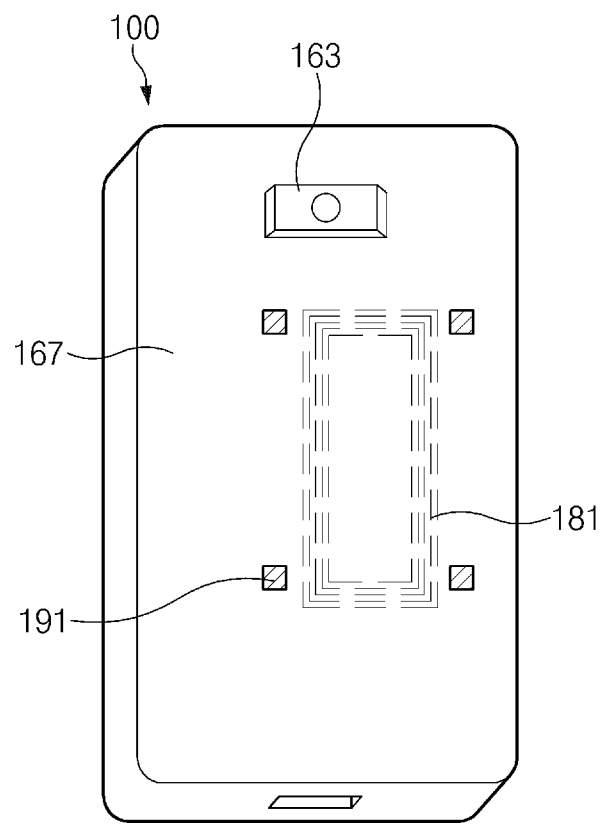
FIG. 8 is a drawing illustrating an electronic device in which a device magnetic substance is disposed on a back (or battery) cover, according to an embodiment.

FIG. 8 is a drawing illustrating an electronic device in which a device magnetic substance is disposed on a back (or battery) cover, according to an embodiment of the present disclosure.

Referring to FIG. 8, according to various embodiments, an electronic device 100 may include a back cover 167. Alternatively, if the electronic device 100 is implemented as being integrated with a battery, a cover which covers the outside of a display disposed on a front surface of the electronic device 100 may be implemented as integrated with the back cover 167.

According to an embodiment, an RX coil 181 and a device magnetic substance 191 may be disposed on one side of the back cover 167. For example, the RX coil 181 may be disposed on an inner side of the back cover 167. Also, at least part of the device magnetic substance 191 may be disposed on an external surface of the back cover 167. According to various embodiments, at least part of the RX coil 181 may be disposed to be exposed to a surface of the back cover 167. Also, the device magnetic substance 191 may be disposed on an inner side of the back cover 167, such that it is not exposed to an exterior of the electronic device. Alternatively, according to various embodiments, the RX coil 181 and the device magnetic substance 191 may be disposed on an inner side of the back cover 167. Alternatively, the RX coil 181 and the device magnetic substance 191 may be disposed on an external surface of the back cover 167. The device magnetic substance 191 may be located on an outer portion of the RX coil 181.

Meanwhile, in FIGS. 6 to 8, an embodiment is exemplified in which the RX coil 181 is disposed such that placement is biased to the "right" (as shown in the illustrations) by a certain portion or degree. However, various embodiments may not be limited thereto. For example, the RX coil 181 may be disposed within a region corresponding to the center of the electronic device 100, or placed as to be biased towards any of the other edges of the electronic device 100. Additionally, the electronic device 100 may further include a camera 163 and the like.

According to various embodiments, an electronic device may include a receive (RX) coil configured to form a surface by being wound associated with wireless charging, a central portion of which is empty, a device magnetic substance configured to be disposed on a position spaced apart from the central portion of the RX coil at a certain distance, and a wireless charging module configured to obtain power induced to the RX coil.

According to various embodiments, the electronic device may further include a battery configured to be charged by the obtained power by connecting with the wireless charging module and to have one side surface on which the RX coil is disposed.

According to various embodiments, the device magnetic substance may be disposed on one side of a surface of the battery and may be disposed on a region except for a region where the RX coil is disposed.

According to various embodiments, the electronic device may further include a holding cover to be disposed to cover a holding part in which a battery is held, on which the RX coil is disposed.

According to various embodiments, the device magnetic substance may be disposed on one side of a surface of the holding cover and may be disposed on a region except for a region where the RX coil is disposed.

According to various embodiments, the electronic device may further include a back cover (e.g., a region located on a back surface of a battery cover or a case portion which forms the appearance of the electronic device) configured to disposed to cover a back surface on which a battery is disposed and to have one side on which at least one of the RX coil or the device magnetic substance is disposed.

According to various embodiments, the at least one of the RX coil or the device magnetic substance may be disposed on least one of an inner side or an outer side of the back cover.

According to various embodiments, the electronic device may further include an RX coil substrate on which the RX coil is disposed.

According to various embodiments, the device magnetic substance may be disposed on one side of the RX coil substrate.

According to various embodiments, the device magnetic substance may include a plurality of device sub magnetic substances disposed at a certain interval on outer portions of the RX coil.

According to various embodiments, the plurality of device sub magnetic substances may be disposed to be symmetrical with each other with respect to a central point of the RX coil.

According to various embodiments, the device magnetic substance may be disposed to be substantially the same or similar in arrangement form to a pad magnetic substance disposed in a wireless charging device.

Figure 9:
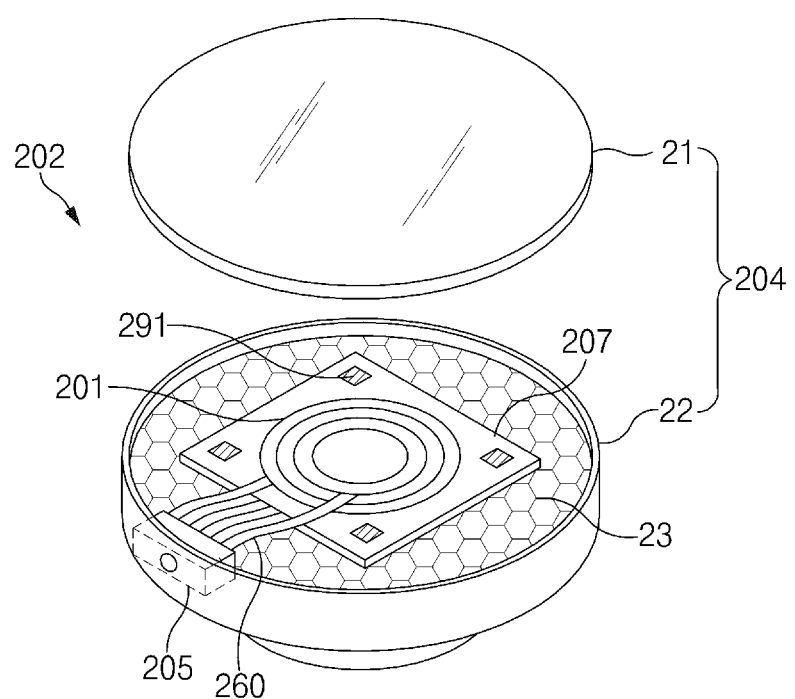
FIG. 9 is an exploded perspective view illustrating a wireless charging pad according to an embodiment.

FIG. 9 is an exploded perspective view illustrating a wireless charging pad according to an embodiment.

Referring to FIG. 9, a wireless charging pad 202 according to an embodiment may include an upper case 21, a lower case 22, and a supporting structure, for example, a bearing module 23. Also, the wireless charging pad 202 may include a TX coil substrate 207, a TX coil 201, a pad magnetic substrate 291, a power cable 260, and a pad PCB 205.

The upper case 21 may be implemented as, for example, a circle or an oval in the form of a cover which covers the lower case 22. For example, at least part of the upper case 21 may be transparently formed and may be made of a transparent material. According to an embodiment, a region corresponding to a position where the TX coil 201 is disposed (e.g., a certain region of the center of the lower case 22), on the upper case 21 may be transparently implemented. The entire surface of the upper case 21 may be evenly formed. However, the upper case 21 may alternatively be formed as to grow in depth according to a predetermined size when approaching its central portion to or from its periphery, or may have a shape which becomes concave towards its inner side.

The lower case 22 may include an empty region disposed at its inner side to arrange or receive the bearing module 23, the TX coil substrate 207, and the like. An upper portion of the lower case 22 may be open. The opened region of the lower case 22 may be covered when combined with or enclosed by the upper case 21. The bearing module 23 may be disposed at the inner side of the lower case 22. A certain empty space may be formed in an upper side of the lower case 22, as combined with the upper case 21, such that the TX coil substrate 207 disposed on the bearing module 23 may be moved in a certain direction. The pad PCB 205 may be disposed at one side of the lower case 22. The lower case 22 may include a connection hole through which a charging cable passes through to operatively connect the pad PCB 205 with the charging cable.

The bearing module 23 may be disposed at an inner side of the lower case 22. The TX coil substrate 207 may be disposed on the bearing module 23. The bearing module 23 is implemented as to easily move the TX coil substrate 207 in a certain direction. The bearing module 23 may include a plurality of bearings for supporting a back surface of the TX coil substrate 207. The plurality of bearings may be made of various materials such as metals or nonmetals (e.g., ceramics).

The TX coil substrate 207 may be disposed on the bearing module 23. For example, the TX coil 201 may be disposed on a central portion of the TX coil substrate 207. The pad magnetic substance 291 may be disposed on an outer portion of the TX coil substrate 207 (or an outer portion of the TX coil 201). Therefore, if an object corresponding to the pad magnetic substance 291 approaches on the upper case 21, the TX coil substrate 207 may move in accordance with the approach of the object via magnetism.

The power cable 260 may be formed of a flexible material allowing for bending or flexing in response to motion of the TX coil substrate 207. The power cable 260 may operatively connect the pad PCB 205 with the TX coil 201 and may supply power, received from the pad PCB 205, to the TX coil 201. The power cable 260 may in some embodiments be flexible in some or all directions.

Figure 10:
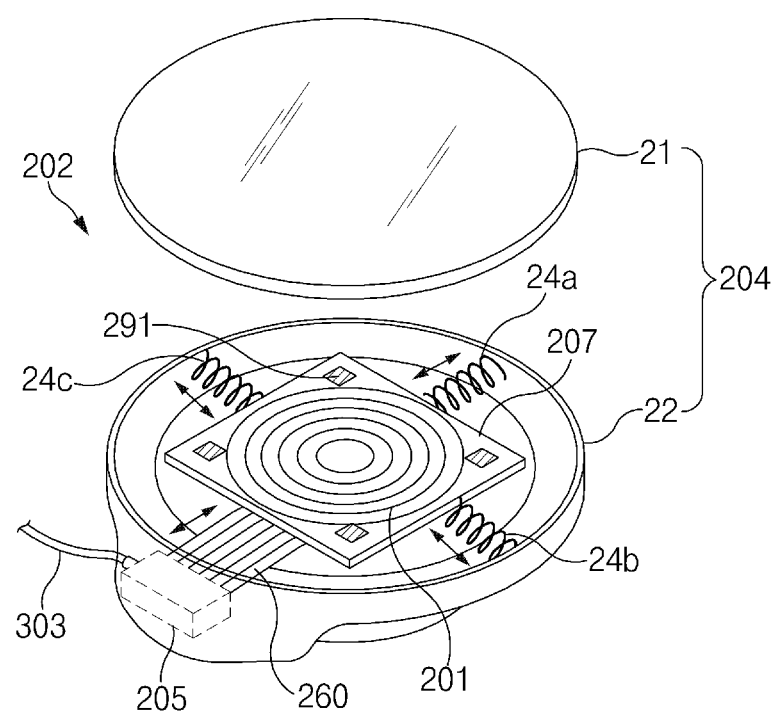
FIG. 10 is an exploded perspective view illustrating a wireless charging pad according to another embodiment.

FIG. 10 is an exploded perspective view illustrating a wireless charging pad according to another embodiment of the present disclosure.

Referring to FIG. 10, a wireless charging pad 202 may include an upper case 21, a lower case 22, and a supporting structure, for example, an elastic structure. Also, the wireless charging pad 202 may include a TX coil substrate 207, a TX coil 201, a pad magnetic substance 291, a power cable 260, and a pad PCB 205.

The upper case 21 may be substantially the same or similar in shape to an upper case 21 described with reference to FIG. 9. According to an embodiment, the upper case 21 may be implemented having a variety of forms or shapes, such as a polygon, a circle or oval (e.g., cylindrically) in the form of a cover which covers the lower case 22. For example, at least part of the upper case 21 may be transparently formed and may be implemented via a transparent material (e.g., a transparent plastic, glass, and the like).

The lower case 22 may include the elastic structure at its inner side, which supports the TX coil substrate 207 such that the TX coil 201 is movable. The lower case 22 may have structure including a sidewall formed to a certain height, so as to fix one side of the elastic structure. The pad PCB 205 may be disposed at one side of the lower case 22. The lower case 22 may include a connection hole through which a charging cable may pass to operatively connect the pad PCB 205 with the charging cable. In FIG. 10, an embodiment is exemplified as one side of the lower case 22 is protruded to arrange the pad PCB 205. However, various embodiments may not be limited thereto. For example, the pad PCB 205 may be disposed under the TX coil substrate 207. Therefore, the lower case 22 may be implemented in the form of having a round circumference without a separate protruding structure.

The power cable 260 may be formed of a flexible material capable of bending or "crooked" or "kinked" configurations, in response to motion of the TX coil substrate 207. The power cable 260 may connect the pad PCB 205 with the TX coil 201 and may supply power, supplied from the pad PCB 205, to the TX coil 201. The power cable 260 may be bent or crooked in all directions.

One side of the elastic structure may couple or connect with the TX coil substrate 207, and the other side may couple or connect with the sidewall of the lower case 22. This elastic structure may include a plurality of elastic bodies 24a to 24c. In FIG. 10, an embodiment is exemplified as the three elastic bodies 24a to 24c are disposed. One side of each of the elastic bodies 24a to 24c may connect with a side of the TX coil substrate 207, and the other side may be affixed to the sidewall of the lower case 22. According to an embodiment, the elastic bodies 24a to 24c may support the TX coil substrate 207, allowing movement in front and rear directions. Therefore, if an object (e.g., an object forming gravitation with the pad magnetic substance 291) associated with the pad magnetic substance 291 approaches on the upper case 21, the elastic bodies 24a to 24c may support the TX coil substrate 207 to be movable to the corresponding object. If the object is spaced apart from the upper case 21 at a certain distance, the elastic bodies 24a to 24c may exert a restoring force, such that the TX coil substrate 207 returns to an original position (e.g., a central portion of the lower case 22).

In FIG. 10, an embodiment is exemplified as the elastic structure is implemented in the form of a spring. However, various embodiments may not be limited thereto. For example, at least part of the spring-shaped elastic structure may be made of a band such as a rubber material. Alternatively, at least part of the elastic structure may be made of a plastic material or a fiber material, and the like having flexibility.

In FIG. 10, an embodiment is exemplified as the three elastic bodies 24a to 24c are disposed as the power cable 260 is disposed at one side of the TX coil substrate 207. However, various embodiments may not be limited thereto. For example, the elastic structure may include an elastic body disposed in a position of the power cable 260. Also, the elastic structure may include elastic bodies disposed on corners of the TX coil substrate 207 as well as side edges of the TX coil substrate 207.

In FIG. 10, an embodiment is exemplified as the elastic structure is disposed at an inner side of the lower case 22. Various embodiments may not be limited thereto. For example, the elastic structure may be disposed in the upper case 21. In this case, a sidewall of a certain height may be formed on the edge of the upper case 21, and the TX coil substrate 207 may be disposed at an inner side of the upper case 21 on an axis of the elastic structure.

Figure 11:
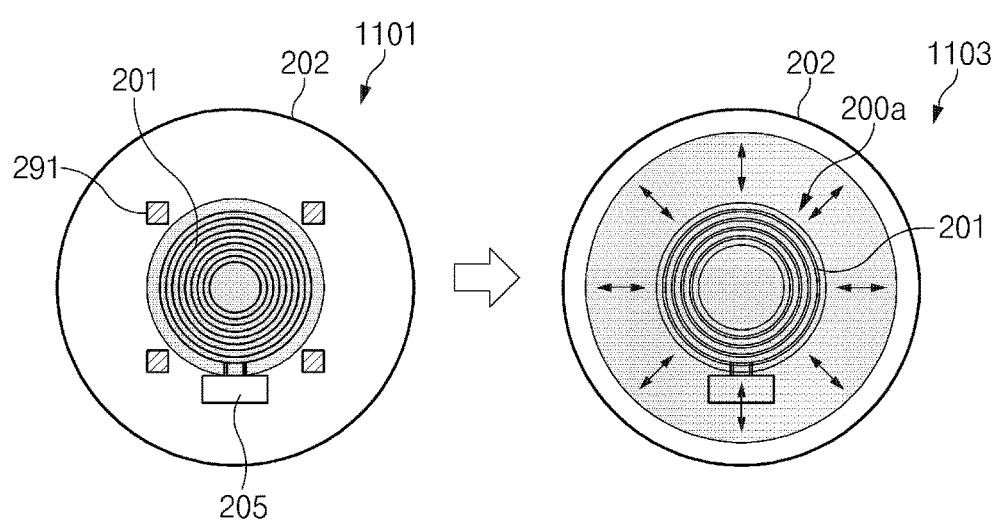
FIG. 11 is a drawing illustrating a movement radius of a transmit (TX) coil of a wireless charging pad according to an embodiment.

FIG. 11 is a drawing illustrating a movement radius of a TX coil of a wireless charging pad according to an embodiment of the present disclosure.

Referring to FIG. 11, a TX coil 201, a pad magnetic substance 291, and a pad PCB 205 connected with the TX coil 201 may be disposed at an inner side of a wireless charging pad 202. Additionally, the wireless charging pad 202 may further include a TX coil substrate on which the TX coil 201 and the pad magnetic substance 291 are disposed, a power cable which connects the pad PCB 205 with the TX coil 201, and the like. According to an embodiment, the wireless charging pad 202 may include a bearing module or an elastic structure, and the like, such that the TX coil 201 is moveable within the inner side in at least one particular direction. FIG. 10 illustrates a simple internal structure of the wireless charging pad 202 to describe a movement radius of the TX coil 201.

Referring to state 1101, the TX coil 201 and the pad magnetic substance 291 may be disposed on a certain point relative to the center of the wireless charging pad 202. If a predetermined object (e.g., an electronic device 100 in which a device magnetic substance is disposed) having a magnetic property with the pad magnetic substance 291 approaches on the wireless charging pad 202, the pad magnetic substance 291 may be pulled in the direction from which the device magnetic substance approaches.

According to an embodiment, in state 1103, the TX coil 201 fixed together with the pad magnetic substance 291 may be moved in the direction that the device magnetic substance approaches. In this case, if the TX coil 201 is designed to be movable, as facilitated by the bearing module or the elastic structure (here, depicted as being in any direction), and the TX coil 201 may thus be moved within a range of a predetermined region 200*a* in the wireless charging pad 202.

As described above, as the TX coil 201 moves in various directions in the wireless charging pad 202. Thus, even if the electronic device 100 is placed on a non-matching position of a wireless charging device, the TX coil 201 of the wireless charging device may move to a position as to match with an RX coil 181 of the electronic device 100 to facilitate charging.

According to various embodiments, a wireless charging pad may include a pad case, a TX coil configured to be disposed at an inner side of the pad case and to form a surface by being wound associated with wireless charging, a central portion of which is empty, a TX coil substrate configured such that the TX coil is disposed, a pad magnetic substance configured to be disposed on a position of the TX coil substrate, the position spaced apart from the central portion of the TX coil at a certain distance, and a supporting structure configured to support the TX coil substrate to be movable.

According to various embodiments, the supporting structure may include a bearing module configured to be disposed under the TX coil substrate.

According to various embodiments, the supporting structure may include an elastic structure configured to fix at least one of sides of the TX coil substrate to the pad case.

According to various embodiments, the pad case may be transparently formed such that at least part of a region on which the TX coil is observed from the outside.

According to various embodiments, the wireless charging pad may further include a pad PCB configured to supply power supplied from the outside to the TX coil and a power cable configured to connect the pad PCB with the TX coil and to have flexibility of being bent in response to motion of the TX coil substrate.

According to various embodiments, the pad magnetic substance may be substantially the same or similar in arrangement form to a device magnetic substance disposed in an electronic device.

According to various embodiments, the pad magnetic substance may include a plurality of pad sub magnetic substances configured to be disposed to be symmetrical with each other with respect to a central point of the TX coil.

Figure 12:
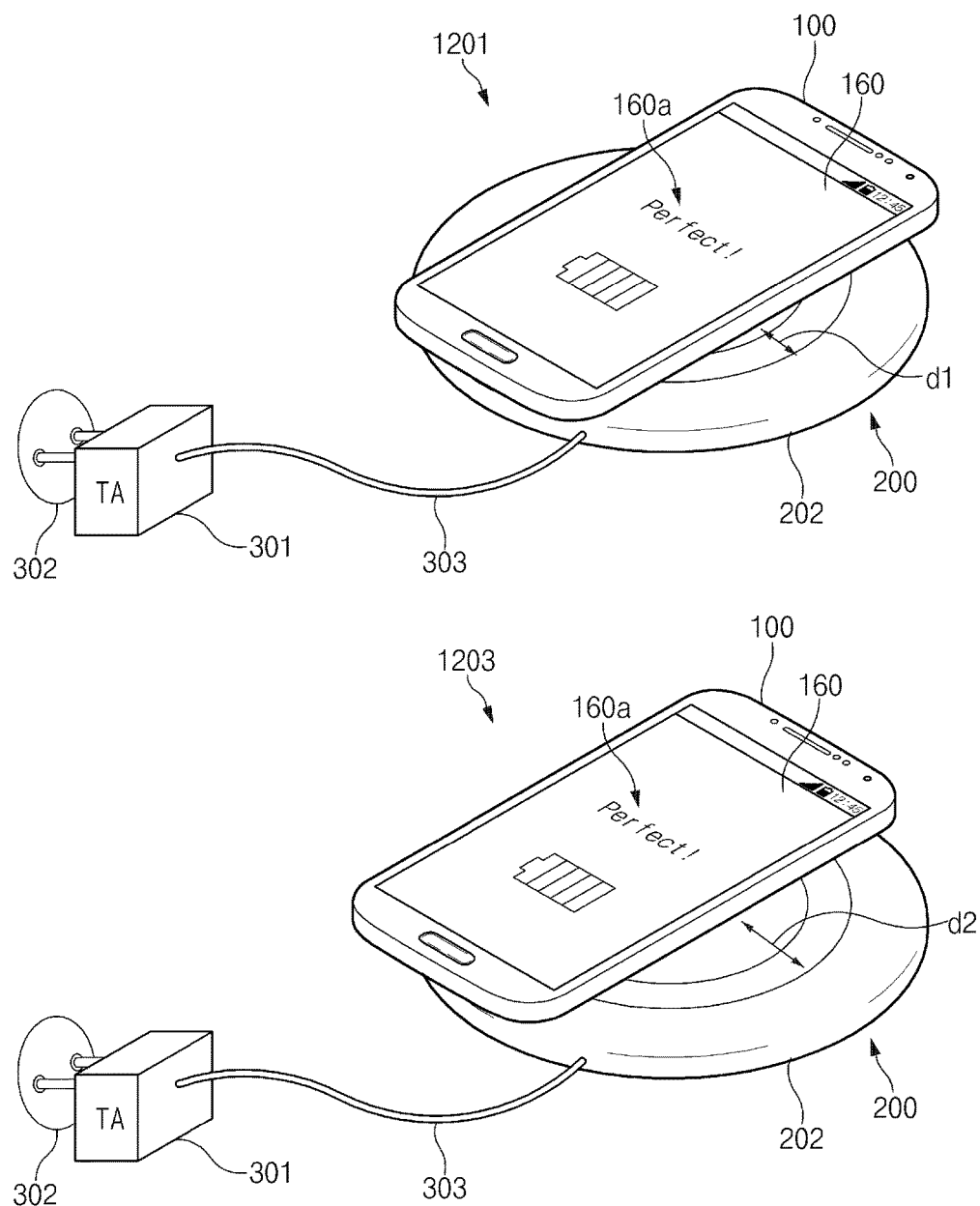
FIG. 12 is a drawing illustrating a wireless charging environment according to an embodiment.

FIG. 12 is a drawing illustrating a wireless charging environment according to an embodiment.

Referring to FIG. 12, the wireless charging environment according to an embodiment may include a wireless charging device 200 and an electronic device 100. In a state where an adaptor 301 of the wireless charging device 200 is operatively connected to an outlet 302, and the charging cable 303 is operatively connected to a wireless charging pad 202, if the electronic device 100 is placed on the wireless charging device 200, the electronic device 100 may be in a wireless charging state.

According to an embodiment, in state 1201, the center of the electronic device 100 may be located on the center of the wireless charging device 200. In this operation, a distance between a side end of the electronic device 100 and an outer portion of the wireless charging device 200 may be a first distance d1. As the center of the electronic device 100 is accurately located on the center of the wireless charging device 200, a TX coil of the wireless charging device 200 and an RX coil of the electronic device 100 may be arranged within a range of a predetermined error in a vertical direction. After the electronic device 100 receives power from the wireless charging device 200, if a power (e.g., an inductive current) of a predetermined level is collected in the RX coil, the electronic device 100 may output a (display) object 160*a*, corresponding to a normal charging state, on a display 160. According to an embodiment, if the power of the predetermined level is collected in the RX coil without a request to increase a supply amount of separate power to the wireless charging device 200, the electronic device 100 may determine a current charging state as a charging state in a normal alignment state and may control the display 160 to output the object 160*a*.

According to various embodiments, in state 1203, the electronic device 100 may be located on the wireless charging device 200 based on a user operation. In this case, the center of the electronic device 100 is placed on a position spaced apart from the center of the wireless charging device 200 at a certain distance. Therefore, a distance between one side end of the electronic device 100 and one side edge of the wireless charging device 200 may be a second distance d2. The second distance d2 may be longer than the first distance d1. Although the electronic device 100 is disposed in this state, since a pad magnetic substance 291 of FIG. 1 disposed in the wireless charging device 200 is pulled by a device magnetic substance 191 of FIG. 1 by magnetic attraction, the TX coil may be arranged normally or nominally with the RX coil, allowing charging function by movement of the TX coil (as shown by FIG. 11). Therefore, the electronic device 100 may output the object 160*a*, corresponding to the normal charging state in state 1201, on the display 160 in response to a charging operation in a normal state.

The object 160*a* may be omitted. Alternatively, the object 160*a* may be replaced or output with audio information, vibration pattern information, lamp color information, or lamp ON/OFF information.

According to various embodiments, a wireless charging device may include a wireless charging pad configured to include a pad case, a TX coil configured to be disposed at an inner side of the pad case and to form a surface by being wound, a central portion of which is empty, a TX coil substrate configured such that the TX coil is disposed, a pad magnetic substance configured to be disposed on a position of the TX coil substrate, the position spaced apart from the central portion of the TX coil at a certain distance, and a supporting structure configured to support the TX coil substrate to be movable; a charging cable and an adaptor configured to connect to an external power supply and to supply power to the wireless charging pad.

Figure 13:
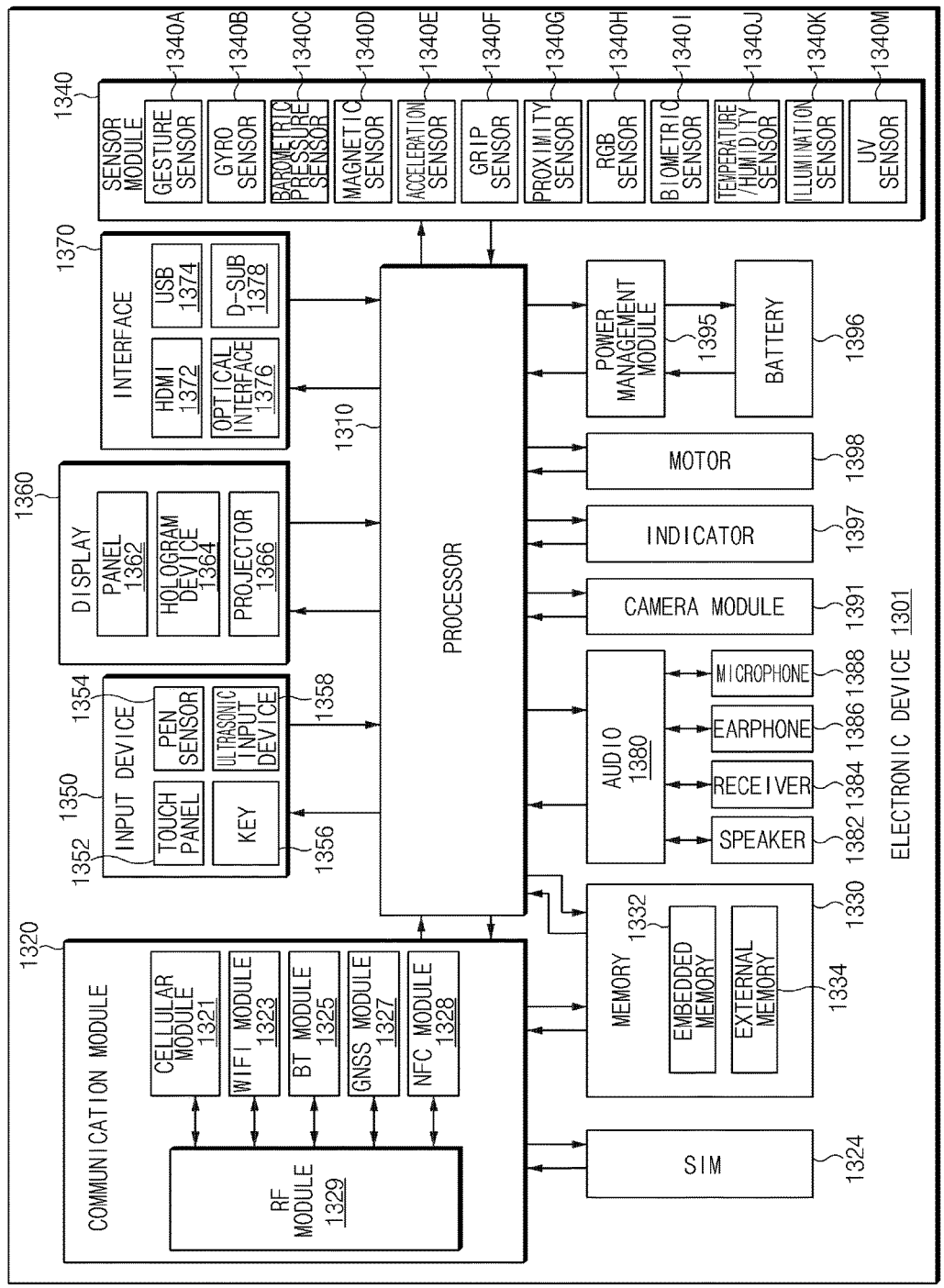
FIG. 13 is a block diagram illustrating a configuration of an electronic device according to an embodiment.

FIG. 13 is a block diagram illustrating a configuration of an electronic device according to an embodiment.

Referring to FIG. 13, an electronic device 1301 may include, for example, all or part of an electronic device described in the various embodiments described above. The electronic device 1301 may include one processor 1310 (e.g., an application processor (AP)), a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application program to control a plurality of hardware or software components connected thereto and may process and compute a variety of data. The processor 1310 may be implemented with, for example, a system on chip (SoC). According to an embodiment, the processor 1310 may further include a graphic processing unit (GPU) (not shown) and/or an image signal processor (not shown). The processor 1310 may include at least some (e.g., a cellular module 1321) of the components shown in FIG. 13. The processor 1310 may load instructions or data received from at least one of other components (e.g., a non-volatile memory) into a volatile memory to process the data and may store various data in a non-volatile memory.

The processor 1310 may determine whether a TX coil of a wireless charging device 200 of FIG. 1 and an RX coil of the electronic device 1301 are in a normal alignment state (e.g., a state where the TX coil and the RX coil are disposed to be overlapped with each other in a vertical direction by a predetermined area or more) in a wireless charging operation. For example, if a wireless charging function is performed, the processor 1310 may determine the normal alignment state according to whether an amount of power collected in the RX coil meets a predetermined condition or whether there is a request to increase a supply amount of power to the wireless charging device 200. If determining the normal alignment state, the processor 1310 may output an object, corresponding to the normal alignment state, on the display 1360.

The communication module 1320 may include, for example, the cellular module 1321, a wireless-fidelity (Wi-Fi) module 1323, a Bluetooth (BT) module 1325, a global navigation satellite system (GNSS) module 1327 (e.g., a GPS module, a Glonass module, a Beidou module, or a Galileo module), a near field communication (NFC) module 1328, and a radio frequency (RF) module 1329. Additionally, the communication module 1320 may further include a magnetic secure transmission (MST) module (not shown).

The cellular module 1321 may provide, for example, a voice call service, a video call service, a text message service, or an Internet service, and the like through a communication network. According to an embodiment, the cellular module 1321 may identify and authenticate the electronic device 1301 in a communication network using the SIM 1324 (e.g., a SIM card). According to an embodiment, the cellular module 1321 may perform at least part of functions which may be provided by the processor 1310. According to an embodiment, the cellular module 1321 may include a communication processor (CP).

The Wi-Fi module 1323, the BT module 1325, the GNSS module 1327, or the NFC module 1328 may include, for example, a processor for processing data transmitted and received through the corresponding module. According to various embodiments, at least some (e.g., two or more) of the cellular module 1321, the Wi-Fi module 1323, the BT module 1325, the GNSS module 1327, or the NFC module 1328 may be included in one integrated chip (IC) or one IC package.

The RF module 1329 may transmit and receive, for example, a communication signal (e.g., an RF signal). Though not shown, the RF module 1329 may include, for example, a transceiver, a power amplifier module (PAM), a frequency filter, or a low noise amplifier (LNA), or an antenna, and the like. According to another embodiment, at least one of the cellular module 1321, the Wi-Fi module 1323, the BT module 1325, the GNSS module 1327, or the NFC module 1328 may transmit and receive an RF signal through a separate RF module.

The SIM 1324 may include, for example, a card which includes a SIM and/or an embedded SIM. The SIM 1324 may include unique identification information (e.g., an integrated circuit card identifier (ICCID)) or subscriber information (e.g., an international mobile subscriber identity (IMSI)).

The memory 1330 may include, for example, an embedded memory 1332 or an external memory 1334. The embedded memory 1332 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1334 may include a flash drive, for example, a compact flash (CF), a secure digital (SD), a micro-SD, a mini-SD, an extreme digital (xD), a multimedia car (MMC), or a memory stick, and the like. The external memory 1334 may operatively and/or physically connect with the electronic device 1301 through various interfaces.

The electronic device 1301 may further include a secure module (not shown). The secure module may be a module which has a relatively higher secure level than the memory 1330 and may be a circuit which stores secure data and guarantees a protected execution environment. The secure module may be implemented with a separate circuit and may include a separate processor. The secure module may include, for example, an embedded secure element (eSE) which is present in a removable smart chip or a removable SD card or is embedded in a fixed chip of the electronic device 1301. Also, the secure module may be driven by an OS different from the OS of the electronic device 1301. For example, the secure module may operate based on a Java card open platform (JCOP) OS.

The sensor module 1340 may measure, for example, a physical quantity or may detect an operation state of the electronic device 1301, and may convert the measured or detected information to an electric signal. The sensor module 1340 may include at least one of, for example, a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., red, green, blue "RGB" sensor), a biometric sensor 1340I, a temperature/humidity sensor 1340J, an illumination sensor 1340K, or an ultraviolet (UV) sensor 1340M. Additionally or alternatively, the sensor module 1340 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1340 may further include a control circuit for controlling at least one or more sensors included therein. According to various embodiments, the electronic device 1301 may further include a processor configured to control the sensor module 1340, as part of the processor 1310 or to be independent of the processor 1310. While the processor 1310 is in a sleep state, the electronic device 1301 may control the sensor module 1340.

The input device 1350 may include, for example, a touch panel 1352, a (digital) pen sensor 1354, a key 1356, or an ultrasonic input unit 1358. The touch panel 1352 may use at least one of, for example, a capacitive type, a resistive type, an infrared type, or an ultrasonic type. Also, the touch panel 1352 may further include a control circuit. The touch panel 1352 may further include a tactile layer and may provide a tactile reaction to a user.

The (digital) pen sensor 1354 may be, for example, part of the touch panel 1352 or may include a separate sheet for recognition. The key 1356 may include, for example, a physical button, an optical key, or a keypad. The ultrasonic input unit 1358 may allow the electronic device 1301 to detect a sound wave using a microphone (e.g., a microphone 1388) and to verify data through an input tool generating an ultrasonic signal.

The display 1360 may include a panel 1362, a hologram device 1364, or a projector 1366. The panel 1362 may include the same or similar configuration to that of the display 160. The panel 1362 may be implemented to be, for example, flexible, transparent, or wearable. The panel 1362 and the touch panel 1352 may be integrated into one module. The hologram device 1364 may show a stereoscopic image in a space using interference of light. The projector 1366 may project light onto a screen to display an image. The screen may be positioned, for example, inside or outside the electronic device 1301. According to an embodiment, the display 1360 may further include a control circuit for controlling the panel 1362, the hologram device 1364, or the projector 1366. The display 1360 may output an object, corresponding to the normal alignment state with the wireless charging device 200, in response to control of the processor 1310.

The interface 1370 may include, for example, a high-definition multimedia interface (HDMI) 1372, a universal serial bus (USB) 1374, an optical interface 1376, or a D-subminiature 1378. Additionally or alternatively, the interface 1370 may include, for example, a mobile high definition link (MHL) interface, an SD card/multimedia card (MMC) interface, or an infrared data association (IrDA) standard interface.

The audio module 1380 may convert a sound and an electric signal in dual directions. The audio module 1380 may process sound information input or output through, for example, a speaker 1382, a receiver 1384, an earphone 1386, or the microphone 1388, and the like. According to various embodiments, the audio module 1380 may output audio information, corresponding to the normal alignment state with the wireless charging device 200, in response to control of the processor 1310.

The camera module 1391 may be a device which captures a still image and a moving image. According to an embodiment, the camera module 1391 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1395 may manage, for example, power of the electronic device 1301. According to an embodiment, though not shown, the power management module 1395 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1396 and voltage, current, or temperature thereof while the battery 1396 is charged. The battery 1396 may include, for example, a rechargeable battery or a solar battery.

The indicator 1397 may display a specific state of the electronic device 1301 or part (e.g., the processor 1310) thereof, for example, a booting state, a message state, or a charging state, and the like. According to an embodiment, the indicator 1397 may include an indicator corresponding to a wireless charging state.

The motor 1398 may convert an electric signal into mechanical vibration and may generate vibration or a haptic effect, and the like. Though not shown, the electronic device 1301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor (e.g., a processor 1310 of FIG. 13), one or more processors may perform functions corresponding to the instructions. The computer-readable storage media may be, for example, a memory 1330 of FIG. 13.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, some of the operations may be executed in a different order or may be omitted, and other operations may be added.

According to various embodiments of the present disclosure, the electronic device may more easily change an alignment state of the electronic device and the wireless charging device.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:
1. A wireless charging pad, comprising:
   a pad case;
   a transmit (TX) coil disposed on an inner side of the pad case, and wound to a surface for which a central portion of the TX coil is empty;
   a TX coil substrate on which the TX coil is disposed;
   a pad magnetic substance disposed on the TX coil substrate at a distance from the central portion of the TX coil; and
   a supporting structure supporting the TX coil substrate, wherein the supporting structure is vertically movable relative to the pad case when the pad case is in a substantially horizontal orientation, the supporting structure comprising an elastic structure directly affixing at least one side of the TX coil substrate to a printed circuit board (PCB) below the TX coil substrate,
   wherein the supporting structure is movable to a direction of an upper case of the pad case when an object forming a magnetic force with the pad magnetic substance approaches on the upper case, wherein the direction is against the direction of gravity, and
   wherein the supporting structure moves vertically when an external magnetic force is applied causing a plane of the PCB and a plane of the TX coil substrate to physically separate, thereby forming a gap between the plane of the TX coil substrate and the plane of the PCB.

2. The wireless charging pad of claim 1, wherein the supporting structure comprises:
   a bearing module disposed under the TX coil substrate.

3. The wireless charging pad of claim 1, wherein the pad case is transparently formed such that at least part of a region on which the TX coil is observable from an exterior of the pad case.

4. The wireless charging pad of claim 1, further comprising:
   a pad printed circuit board (PCB) configured to receive power and supply the received power to the TX coil inside the pad case; and
   a power cable inside the pad case, electrically connecting the pad PCB to the TX coil substrate to supply the received power to the TX coil, wherein the power cable is flexible to accommodate any motion of the TX coil substrate.

5. The wireless charging pad of claim 1, wherein the pad magnetic substance is disposed in an arrangement matching at least one device magnetic substance as disposed in an electronic device to which the wireless charging pad is configured to be paired to execute wireless charging.

6. The wireless charging pad of claim 1, wherein the pad magnetic substance comprises:
   a plurality of pad sub magnetic substances disposed symmetrically around a central point of the TX coil.

7. A wireless charging device, comprising:
   a wireless charging pad including:
      a pad case,
      a transmit (TX) coil disposed on an inner side of the pad case and wound to a surface for which a central portion is empty,
      a TX coil substrate on which the TX coil is disposed,
      a pad magnetic substance disposed on the TX coil substrate at a distance from the central portion of the TX coil, and
      a supporting structure supporting the TX coil substrate, wherein the supporting structure is vertically movable relative to the pad case when the pad case is in a substantially horizontal orientation, the supporting structure comprising an elastic structure directly affixing at least one side of the TX coil substrate to a printed circuit board (PCB) below the TX coil substrate; and a charging cable and an adaptor configured to operatively connect with an external power supply to supply power to the wireless charging pad, wherein the supporting structure is movable to a direction of an upper case of the pad case when an object forming a magnetic force with the pad magnetic substance approaches on the upper case, wherein the direction is against the direction of gravity, and wherein the supporting structure moves vertically when an external magnetic force is applied causing a plane of a PCB and a plane of the TX coil substrate to physically separate, thereby forming a gap between the plane of the TX coil substrate and the plane of the PCB.

* * * * *